United States Patent
Gao et al.

(10) Patent No.: US 9,942,690 B2
(45) Date of Patent: Apr. 10, 2018

(54) METHOD AND DEVICE FOR INFORMATION PUSH

(71) Applicant: Xiaomi Inc., Beijing (CN)

(72) Inventors: Yi Gao, Beijing (CN); Hongqiang Wang, Bejing (CN); Yunyuan Ge, Beijing (CN)

(73) Assignee: Xiaomi Inc., Beijing (CN)

( * ) Notice: Subject to any disclaimer, the term of this patent is extended or adjusted under 35 U.S.C. 154(b) by 81 days.

(21) Appl. No.: 15/149,993

(22) Filed: May 9, 2016

(65) Prior Publication Data

US 2017/0150290 A1    May 25, 2017

(30) Foreign Application Priority Data

Nov. 20, 2015 (CN) .......................... 2015 1 0812485

(51) Int. Cl.
*H04W 4/00* (2018.01)
*H04M 1/725* (2006.01)
(Continued)

(52) U.S. Cl.
CPC ...... *H04W 4/001* (2013.01); *G06F 17/30386* (2013.01); *G06Q 30/0631* (2013.01);
(Continued)

(58) Field of Classification Search
CPC ...... H04W 4/001; H04W 4/003; H04L 67/26; H04L 67/34; H04M 1/72525; G06F 17/30386; G06Q 30/0631
(Continued)

(56) References Cited

U.S. PATENT DOCUMENTS 8,868,409 B1* 10/2014 Mengibar ............... G10L 15/26
704/10
2011/0307354 A1* 12/2011 Erman ...................... G06F 8/60
705/27.1
(Continued)

FOREIGN PATENT DOCUMENTS

CN    102542042 A    7/2012
CN    102799594 A    11/2012
(Continued)

OTHER PUBLICATIONS

Extended European Search Report dated Apr. 21, 2017 for European Application No. 16163640.2, 12 pages.
(Continued)

*Primary Examiner* — Michael Mapa
(74) *Attorney, Agent, or Firm* — Brinks, Gilson & Lione

(57) ABSTRACT

Method and device for information push are provided in the disclosure, which may include: obtaining a keyword input by a user, identifying an Application Program (APP) package name corresponding to the keyword input based on a first data table stored in the smart device, the first data table including correspondence relationships between APP package names and keywords, determining whether the APP corresponding to the APP package name is installed in the device, pushing the keyword to the APP if the APP is installed in the device. The technical solutions of the disclosure may push the keyword related with the user behaviors to an APP, so that the APP may locate operations related with the keyword, and push the operations to the user in the form of operation prompt messages, and thus facilitate the user quickly starting the related operations of the APP with simple action.

17 Claims, 9 Drawing Sheets

(51) Int. Cl.
*G06Q 30/06* (2012.01)
*H04L 29/08* (2006.01)
*G06F 17/30* (2006.01)

(52) U.S. Cl.
CPC ............ *H04L 67/26* (2013.01); *H04L 67/34* (2013.01); *H04M 1/72525* (2013.01); *H04W 4/003* (2013.01)

(58) Field of Classification Search
USPC ............................. 455/418–420, 414.1–414.3
See application file for complete search history.

(56) References Cited

U.S. PATENT DOCUMENTS

| | | | |
|---|---|---|---|
| 2011/0320446 A1 | 12/2011 | Chakrabarti et al. | |
| 2012/0179706 A1 | 7/2012 | Hobbs et al. | |
| 2012/0284256 A1* | 11/2012 | Mahajan | G06F 17/3087 707/722 |
| 2013/0019265 A1 | 1/2013 | Waller | |
| 2014/0068517 A1* | 3/2014 | Bae | G06F 3/04842 715/835 |
| 2015/0261868 A1* | 9/2015 | Li | G06F 17/30864 707/710 |
| 2015/0302855 A1 | 10/2015 | Kim et al. | |
| 2016/0321355 A1* | 11/2016 | Yin | G06F 17/30864 |

FOREIGN PATENT DOCUMENTS

| | | |
|---|---|---|
| CN | 102799623 A | 11/2012 |
| CN | 104090904 A | 10/2014 |
| CN | 104156368 A | 11/2014 |
| CN | 104572848 A | 4/2015 |
| CN | 104866288 A | 8/2015 |
| EP | 0 841 615 A2 | 5/1998 |
| EP | 1 233 599 A2 | 8/2002 |
| EP | 1 786 186 A2 | 5/2007 |
| JP | 2012-039581 A | 2/2012 |
| JP | 2014-518419 A | 7/2014 |
| JP | 2015-517711 A | 6/2015 |
| KR | 10-2012-0139237 | 12/2012 |
| KR | 10-2013-0132810 A | 12/2013 |
| KR | 10-2015-0050826 A | 5/2015 |
| RU | 2 461 058 C2 | 9/2012 |
| WO | WO 03/104983 A2 | 12/2003 |
| WO | WO 2013/177328 A1 | 11/2013 |
| WO | WO 2013177328 A1 * | 11/2013 ........... G06F 17/243 |
| WO | WO 2015/088853 A1 | 6/2015 |

OTHER PUBLICATIONS

Pandit, Milind S. et al., "The Selection Recognition Agent: Instant Access to Relevant Information and Operations," IUI '97, International Conference on Intelligent User Interfaces, Orlando, FL, ACM, 1997, pp. 47-52.
International Search Report and Written Opinion dated Aug. 19, 2016 for International Application No. PCT/CN2015/099306, 12 pages.
Office Action dated May 12, 2017 for Russian Application No. 2016110593/08, 15 pages.
Office Action dated Feb. 27, 2018 for Japanese Application No. 2017-550977, 8 pages.

* cited by examiner

METHOD AND DEVICE FOR INFORMATION PUSH

CROSS-REFERENCE TO RELATED APPLICATION

This application and claims priority to Chinese Patent Application No. 201510812485.9, filed Nov. 20, 2015, which is incorporated herein by reference in its entirety.

FIELD

The present disclosure generally relates to the field of communication technology, and more particularly to method and device for information push.

BACKGROUND

With the development of the network technology and intelligent hardware technology, a variety of APPs (Application Program) have been enriching the capabilities of intelligent devices, which have gradually become an essential part of life, for example, people may socialize, watch videos, and make on-line purchases or payments on intelligent devices.

In related art, people need to start APPs by themselves to implement expected operations, such as shopping searches, which may start a plurality of APPs to search respectively, and then complete the shopping operation according to the search result, which involves cumbersome operations.

SUMMARY

In view of the fact described above, a method and device for information push are provided in the disclosure. In particular, the disclosure is implemented by the following technical solutions.

According to a first aspect of the present disclosure, a method for pushing information to an application on a smart device is provided, including obtaining a keyword input by a user, identifying an Application Program (APP) package name corresponding to the keyword input based on a first data table stored in the smart device, the first data table including correspondence relationships between APP package names and keywords, determining whether an APP corresponding to the APP package name is installed in the smart device, and pushing the keyword to the target APP when the App is installed in the smart device.

According to a second aspect of embodiments of the present disclosure, a device for information push is provided, including an obtaining module configured to obtain a keyword input by a user, a search module configured to search for a Application Program (APP) corresponding to the keyword, a determination module configured to determine whether the APP is installed in the device, and a first push module configured to push the keyword to the APP when the App is installed locally.

According to a third aspect of embodiments of the present disclosure, a device for pushing information to an application is provided. The device includes a processor and a memory for storing instructions executable by the processor. The processor is configured to obtain a keyword input by a user, identify APP package name corresponding to the keyword input based on a first data table stored in the smart device, the first data table including correspondence relationships between APP package names and keywords, determining whether an APP corresponding to the APP package name is installed in the smart device, and pushing the keyword to the APP when the App is installed in the smart device.

It is to be understood that both the forgoing general description and the following detailed description are exemplary only, and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the invention. Instead, they are merely examples of apparatuses and methods consistent with aspects related to the invention as recited in the appended claims.

Intelligent devices have gradually become an essential part of life. A variety of user behaviors, such as daily communications, social activities, on-line shopping, etc. may be generated in the intelligent devices. User behaviors may reflect the user's interests and hobbies, as well as his demands or intentions to some extent. Therefore, a method and device for information push are provided in the disclosure to facilitate an APP to locate the operations related with a user's demands and intentions, so that the user may quickly start the relevant operations of the APP.

A brief description of the method for information push is provided below.

It should be noted that the method provided in the disclosure is applicable to intelligent devices, which may include: smart phones, tablet computers, smart computers, smart watches, desktop/laptop computer, etc, and the present disclosure is not limited thereto.

Figure 1:
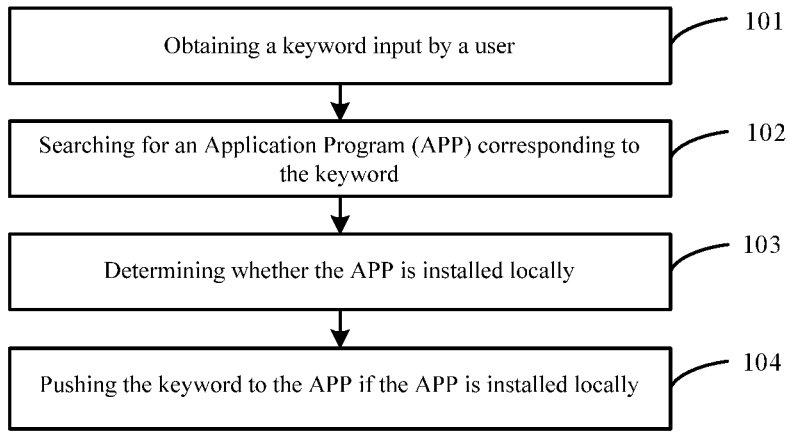
FIG. 1 is a flow chart illustrating a method for information push according to an exemplary embodiment.

As illustrated in FIG. 1, which is a flow chart illustrating a method for information push according to an exemplary embodiment, including the following steps.

In step 101, a keyword input by a user is obtained. It is to be understood that user behaviors taken place in an intelligent device by a user is mainly word input, and words input by a user usually include the information about the user's interests and hobbies, demands and intentions as well as his daily behaviors or habits. Therefore, the disclosure is directed to process the words input in an intelligent device by a user to extract and push valuable information.

In the embodiment, words input by a user may include: keywords or sentences input to an intelligent device by a user. Moreover, words input by a user may be words input to an intelligent device by user in real-time or historically. Therefore, it is to be understood that all such words input in an intelligent device by a user fall within the scope of protection of the disclosure.

In the case that the word input by a user is a sentence, in an implementation of the disclosure, the above-mentioned step 101 may include: obtaining a sentence input by the user, and segmenting the sentence to obtain a keyword.

Since an input method application installed in an intelligent device may typically record the historical words input by the user such as the keywords or sentences, therefore the way of obtaining words input by a user in the disclosure may include with the operation authorization, obtaining words input by the user from the input method application installed in the intelligent device.

In the embodiment, the keyword may be obtained by using the forward maximum matching segmentation method, or the reverse maximum matching segmentation method, or a segmentation method customized by the user to segment the obtained words input by the user, and the present disclosure is not limited thereto.

In the above-mentioned embodiment, the keyword may be obtained from the sentences input by the user, increasing the source of keywords.

In step 102, an Application Program (APP) corresponding to the keyword is searched.

In an embodiment, upon having been obtained the keyword input by the user, a data table recording correspondence relationships between keywords and APP package names may be downloaded from a server, and an APP package name corresponding to the keyword in step 101 may be searched from the aforementioned data table.

For example, the keyword column in the data table may record scan codes. APP package names corresponding to the "scan codes" include: "com.aplipay" and "com.weixin." A scan code "com.alipay" is the package name of alipay, and a scan code "com.weixin" is the package name of weixin.

Further, the data table recording the correspondence relationship between keywords and APP package names may be stored locally to be used directly for next time, thus saving the search time.

In this step, if an APP package name corresponding to the keyword in step 101 is recorded in the aforementioned data table, step 103 is triggered. If an APP package name corresponding to the keyword in step 101 is not recorded in the aforementioned data table, searching is failed, and the current processing flow is terminated.

It should be noted that, APP package name means application package name. Each application will be appended a unique package name in the programming phase. Package names vary from one application to another application, for example the package name of alipay is "com.aplipay", and the package name of weixin is "com.weixin".

In step 103, whether the APP is installed locally is determined. It should be noted that, when an APP is installed on an intelligent device, the system of the intelligent device (android/iOS/Microsoft) may decompress the installation files. Each APP may have a unique package name. For example, the package name of "MMS application" is "com.android.mms." In addition, if an APP is uninstalled from an intelligent device by a user, when reading APP package names in turn, the system will not read the APP package name of this APP.

In the disclosure, when the Application Program (APP) corresponding to the keyword has been found, whether the APP is installed locally may be determined by means of calling the system interface. The aforementioned step 103 may include reading the APP package names of APPs having been successfully installed locally, and determining whether the APP package name of the APP is included in the read APP package names, and if so, determining that the APP is installed locally.

In this step, the APP package name to be determined may be transmitted to the interface. The system may read APP package names installed within it, and compare with the sent APP package name. If matched, it means that this application is installed in the intelligent device.

In one example, an APP corresponding to the keyword is alipay. If a package name "com.alipay" is read by the mobile phone system locally, then alipay is installed by the mobile phone. If "com.alipay" is not read by the mobile phone system locally, then alipay is not installed by the mobile phone.

In the above-mentioned embodiment, whether the APP is installed locally may be determined in real-time, so that the determination result is more accurate.

In step 104, if the App is installed locally, the keyword is pushed to the APP. The following steps may be added after the aforementioned step 104: when the APP starts, pushing an operation prompt message related to the keyword to the user through the APP. By the form of prompt message, the above-mentioned embodiment may prompt the user to employ a way of quick start of APP related operations to implement relevant operations.

In the above-mentioned embodiment, the keyword reflecting the user's interests and hobbies as well as his demands and intentions to an APP, so that the APP may locate operations related with the keyword, and push the operations to the user in the form of the operation prompt messages, and thus facilitate the user quickly starting the related operations of the APP with simple action.

Figure 2:
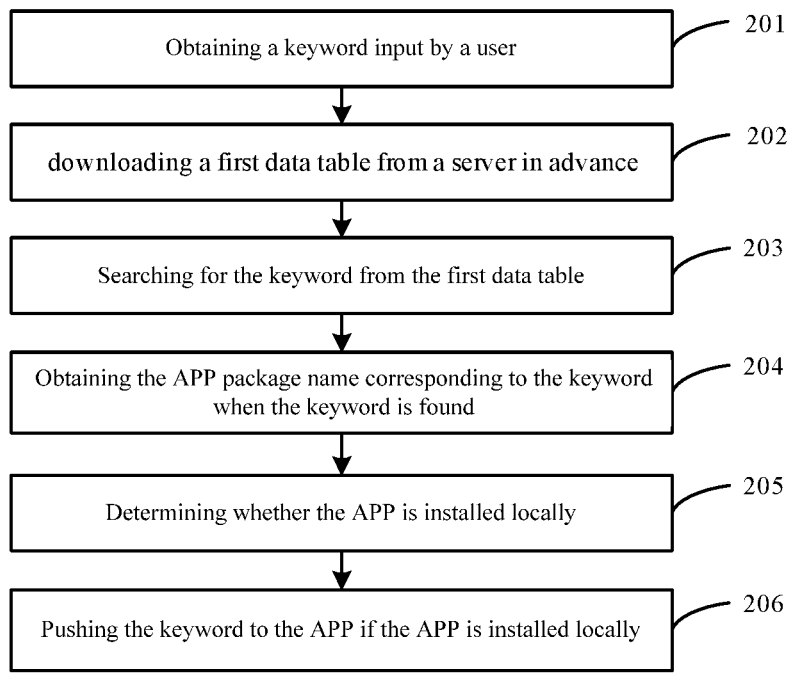
FIG. 2 is a flow chart illustrating another method for information push according to an exemplary embodiment.

FIG. 2 is a flow chart illustrating another method for information push according to an exemplary embodiment, and may include the following steps.

In step 201, a keyword input by a user is obtained. The step 201 in the embodiment is similar with step 101 in the method embodiment illustrated in FIG. 1, and will not be elaborated herein.

In step 202, a first data table is downloaded in advance from a server. The first data table records correspondence relationships between APP package names and keywords related with user behaviors.

The server administrator may edit some words related with user behaviors, such as "purchase a television", "game", etc, while edit the correspondence relationship between each word and APP package name based on the aforementioned words.

In an implementation of the disclosure, the correspondence relationship between keywords and APP package names recorded in the first data table may include: the correspondence relationship between keywords and APP categories, and the correspondence relationship between APP categories and APP package names.

For example, while the server administrator is editing the correspondence relationship in the first data table, a keyword may correspond to one or more APP categories, an APP category may correspond to one or more APPs, each of APPs may carry a package name distinguishing from other APPs. The APP category refer to the board category of one APP, such as the APP classifications in APP store. For example, the APP classifications include shopping applications such as APP package names of Taobao, JD, Meilishuo, etc., tourism applications such as APP package names of Ctrip, Tuniu, Qyer, etc., andfinancial applications such as APP package names of alipay, Baidu Wallet, Tenpay, etc.

The above-mentioned implementation may store the correspondence relationships by the classifications to facilitate the server administrator to maintain the correspondence relationships.

In another implementation of the disclosure, the correspondence relationship between keywords recorded in the first data table and APP package names may include the direct correspondence relationship between keywords and APP package names.

For example, while the server administrator is editing the correspondence relationship in the first data table, a keyword may directly correspond to one or more APP categories, and each APP category may carry a package name distinguished from other APPs. For example, one keyword may directly correspond to Taobao, JD, Meilishuo, etc.

The above-mentioned implementation may only store the direct correspondence relationship to save the storage space.

In step 203, the keyword is searched from the first data table. A comparison is made between the keyword input by the user and the keywords in the first data table. And if there is a keyword identical with the keyword, the search is successful, which triggers to perform step 204. If there is no keyword identical with the keyword, the current processing flow is terminated.

In step 204, upon the keyword having been found, the APP package name corresponding to the keyword is obtained. After the keyword input by the user has been found in the first data table, the APP package name corresponding to the keyword is retrieved from the first data table.

In step 205, whether the APP is installed locally is determined. In step 206, if the App is installed locally, the keyword is push to the APP. Steps 205 and 206 in the embodiment are similar to steps 103 and 104 in the method embodiment illustrated in FIG. 1, and will not be elaborated herein.

By downloading a first data table locally in advance which records the correspondence relationship between keywords and APP package names, the above-mentioned embodiment may save time spending on searching for the APP, and thus improve the efficiency.

Based on the method embodiment illustrated in FIG. 2, the method for information push provided in the disclosure may further add the following steps: periodically downloading a new correspondence relationship between keywords and APP package names with a preset period to update the first data table.

It should be noted that, the set period in the disclosure may by 2 hours, or may be set according to the actual requirements, and the disclosure will not elaborate herein.

The above-mentioned embodiment may update data periodically to ensure the timeliness of the correspondence relationship between keywords and APP package names.

Figure 3:
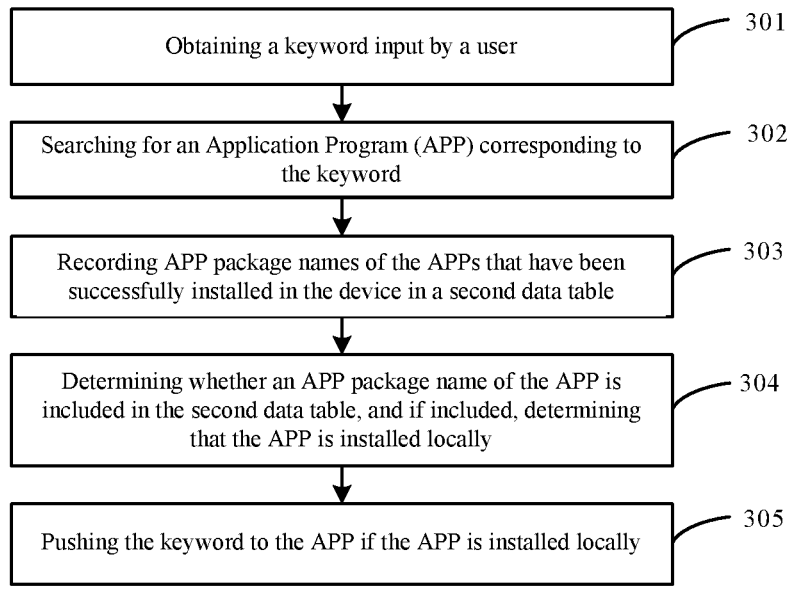
FIG. 3 is a flow chart illustrating another method for information push according to an exemplary embodiment.

As shown in FIG. 3, which is a flow chart illustrating another method for information push according to an exemplary embodiment, and may include the following steps.

In step 301, a keyword input by a user is obtained. In step 302, a Application Program (APP) corresponding to the keyword is searched. Steps 301 and 302 in the embodiment are similar to steps 201-204 in the method embodiment illustrated in FIG. 2, and will not be elaborated herein.

In step 303, a second data table is established in advance. When installing an APPs locally, the APP package names of the APPs having been successfully installed are recorded in the second data table.

In the intelligent system of the disclosure, after having installed each of the APPs, the system may record the currently installed APP package names in the second data table.

For example, if Weixin is installed on an intelligent device, then "com.weixin" will be recorded in the second data table.

In step 304, whether the APP package name of the APP is included in the second data table is determined. And if so, it is determined that the APP is installed locally.

Since the second data table records the APP package names of all of the APPs installed locally on the intelligent device, the APP package name of the APP may be searched in the second data table. If found, the APP is installed locally in the intelligent device. If not, then the APP is uninstalled.

In step 305, when the APP is installed locally, the keyword is pushed to the APP.

The above-mentioned embodiment may record the APP package names of the APP installed locally in the intelligent device in advance, without reading the APP package names of the APPs having been installed every time, reducing the time spent on performing this determination step.

Figure 4:
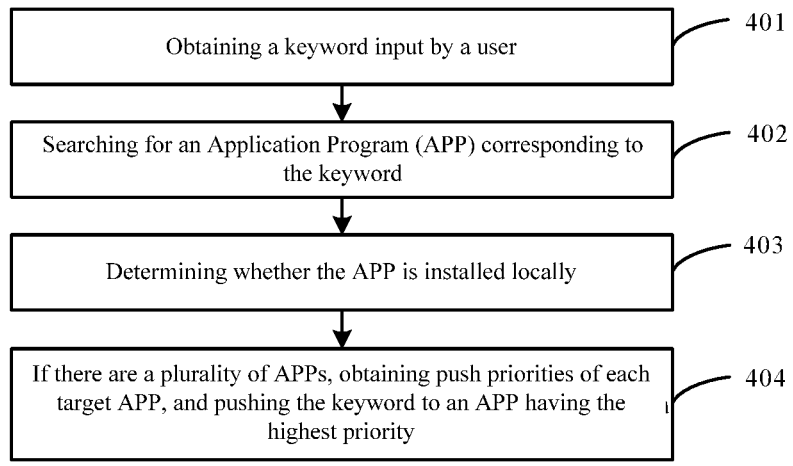
FIG. 4 is a flow chart illustrating another method for information push according to an exemplary embodiment.

FIG. 4 is a flow chart illustrating another method for information push according to an exemplary embodiment, and may include the following steps.

In step 401, a keyword input by a user is obtained. In step 402, the Application Program (APP) corresponding to the keyword is searched. In step 403, whether the APP is installed locally is determined. Steps 401-403 in the embodiment are similar with steps 301-304 in the method embodiment illustrated in FIG. 3, and will not be elaborated herein.

In step 404, when there are a plurality of the APPs, push priorities of every APP is obtained, and the keyword is pushed to the APP having a highest push priority.

In the disclosure, the push priority of an APP may be determined depending on the number of downloads of the APP, or may be determined according to the score of the APP given by users, and will not be elaborated herein.

It is to be understood that in case a plurality of APPs push operation prompt messages to a user, on the one hand, it will consume more system resources, on the other hand, it will reduce the user experience. The above-mentioned embodiment may only push the keyword to one APP to avoid a plurality of APPs pushing prompt messages to a user at the same time.

It is to be understood that sometimes the obtained keyword input by the user may be stored in the intelligent device locally. In the case that the keyword is stored, in another embodiment of the disclosure, after the keyword has been pushed to the APP, the following steps may be further included.

The keyword having been pushed is deleted. The above-mentioned implementation may delete locally the keywords that are already pushed to the APP to avoid matching with these keywords again subsequently and causing the repetition of pushing these keywords to the APP.

In another embodiment provided in the disclosure, the method for information push may further add the following steps to any of the embodiments illustrated in FIGS. 1-4.

When the APP is uninstalled locally, the APP names related with the keywords are pushed to the user locally.

It is to be understood that the words input by a user reflect the user's demand tendency to some extent, therefore if none of APPs corresponding to the words input by the user is installed locally, the relevant APP names may be pushed to the user locally, so that the user may install the relevant APPs locally according to the APP name.

In an alternative implementation, a third data table may be downloaded from a server in advance. The third data table records the correspondence relationship between keywords and APP categories, and the correspondence relationship between APP categories and APP names.

For example, the third data table may records that: keyword "buy a mobile phone" corresponding to APP category "shopping application" corresponding to APP names "Taobao, JD, Meilishuo", etc, Keyword "Maldives" corresponding to APP category "tourism application", APP category "tourism application" corresponding to APP names "Ctrip, Tuniu, Qyer" etc, Keyword "income" corresponding to APP category "financial application", APP category "financial application" corresponding to APP names "alipay, Baidu Wallet, Tenpay" etc.

Accordingly, the APP names related with the keyword pushed locally to the user may include searching for an APP category matching with the keyword from the third data table, and pushing the APP names under this APP category to the user locally.

For example, the keyword input by a user is "buy a mobile phone", the matched APP category in the third data table in the previous instance is "shopping application", then one or more APP names in the shopping application will be pushed to the user.

Figure 5:
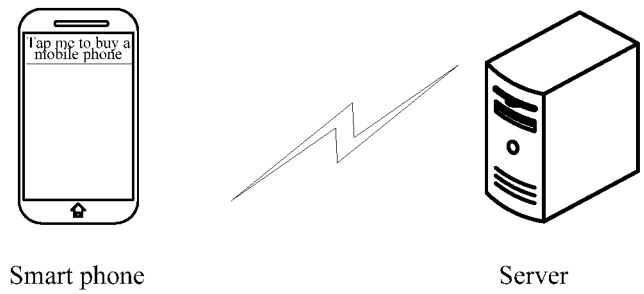
FIG. 5 is a schematic diagram illustrating the application scenario of information push according to another exemplary embodiment.

FIG. 5 is a schematic diagram illustrating the application scenario of information push according to another exemplary embodiment, may include a smart phone and a server. The smart phone and the server are communicatively connected, and the smart phone may download data from the server. In the practice, the way of communication connection may include wired or wireless connection. As illustrated in FIG. 5, APP in the smart phone may notify a user of a message "tap me to buy a mobile phone" in the form of notification bar. The user may enter into the corresponding APP operation interface by tapping the message.

Corresponding to the above-mentioned embodiment of method for information push, the disclosure may further provide an embodiment of device for information push.

Figure 6:
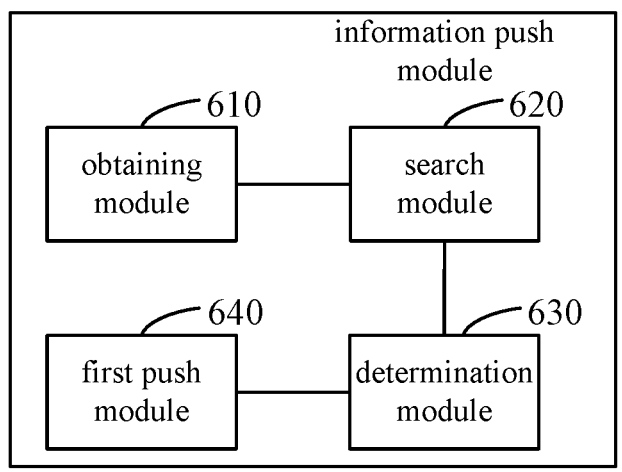
FIG. 6 is a block diagram illustrating a device for information push according to an exemplary embodiment.

FIG. 6 is a block diagram illustrating a device for information push according to an exemplary embodiment, the device may include an obtaining module 610, a search module 620, a determination module 630, and a first push module 640.

The obtaining module 610 is configured to obtain a keyword input by a user. The search module 620 is configured to search for an Application Program (APP) corresponding to the keyword. The determination module 630 is configured to determine whether the APP is installed locally in the device. The first push module 640 is configured to push the keyword to the APP, if the determination result of the determination module 630 is yes.

The technical solutions of the present disclosure may send the keyword reflecting the user's interests and hobbies as well as his demands and intentions to an APP, so that the APP may locate operations related with the keyword, and push the operations to the user in the form of operation prompt messages, and thus facilitate the user quickly starting the related operations of the APP with simple action.

Figure 7:
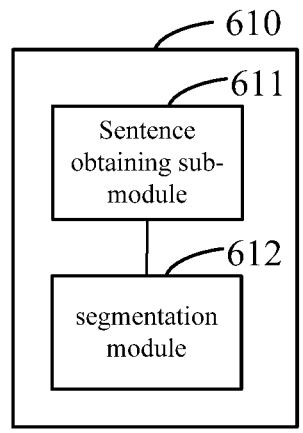
FIG. 7 is a block diagram illustrating another device for information push according to an exemplary embodiment.

FIG. 7 is a block diagram illustrating another device for information push according to an exemplary embodiment, which is based on the above-mentioned embodiment illustrated in FIG. 6, wherein the obtaining module 610 may include a sentence obtaining sub-module 611 configured to obtain a sentence input by the user, a segmentation module configured to segment the sentence to obtain the keyword.

Figure 8:
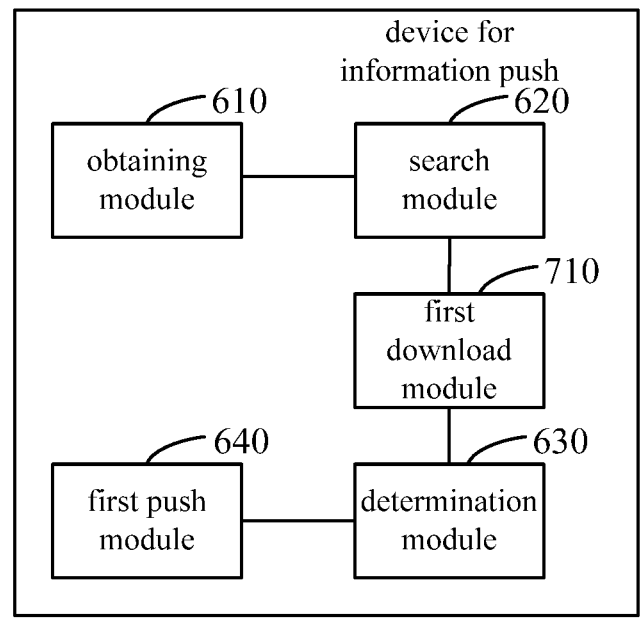
FIG. 8 is a block diagram illustrating another device for information push according to an exemplary embodiment.

FIG. 8 is a block diagram illustrating another device for information push according to an exemplary embodiment, which is based on the above-mentioned embodiments illustrated in FIG. 6 or 7. The device may further include a first download module configured to download a first data table in advance. The first data table records correspondence relationships between APP package names and keywords related with user behaviors.

Figure 9:
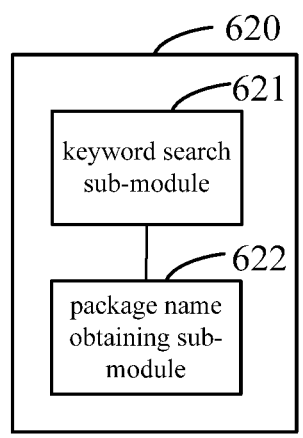
FIG. 9 is a block diagram illustrating another device for information push according to an exemplary embodiment.

FIG. 9 is a block diagram illustrating another device for information push according to an exemplary embodiment, which is based on the above-mentioned embodiment illustrated in FIG. 8. The search module 620 may include a keyword search sub-module 621 configured to search for the keyword from the first data table, a package name obtaining sub-module 622 configured to obtaining the APP package name corresponding to the keyword, if the keyword is found.

Figure 10:
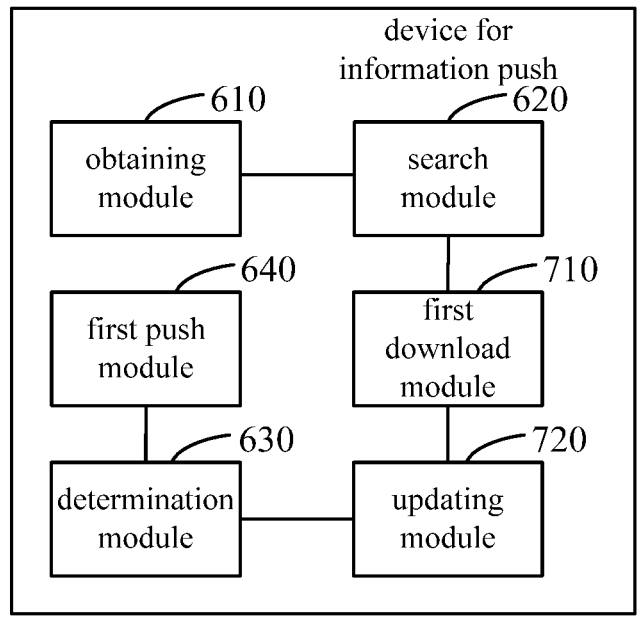
FIG. 10 is a block diagram illustrating another device for information push according to an exemplary embodiment.

FIG. 10 is a block diagram illustrating another device for information push according to an exemplary embodiment, which is based on the above-mentioned embodiments illustrated in FIG. 8 or 9. The device may further include a updating module 720 configured to periodically download a new correspondence relationship between keywords and APP package names with a preset period to update the first data table.

Figure 11:
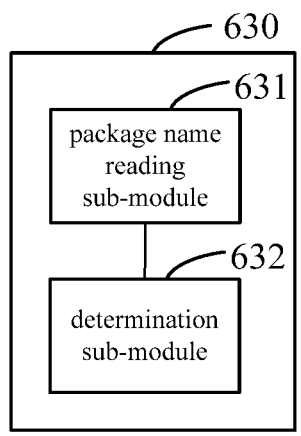
FIG. 11 is a block diagram illustrating another device for information push according to an exemplary embodiment.

FIG. 11 is a block diagram illustrating another device for information push according to an exemplary embodiment, which is based on any of the above-mentioned embodiments illustrated in FIGS. 6-10. The determination module 630 may include a package name reading sub-module 631 configured to read the APP package names of APPs having been successfully installed locally, a determination sub-module 632 configured to determine whether the APP package name of the APP is included in the read APP package names, and if so, determine that the APP is installed locally.

Figure 12:
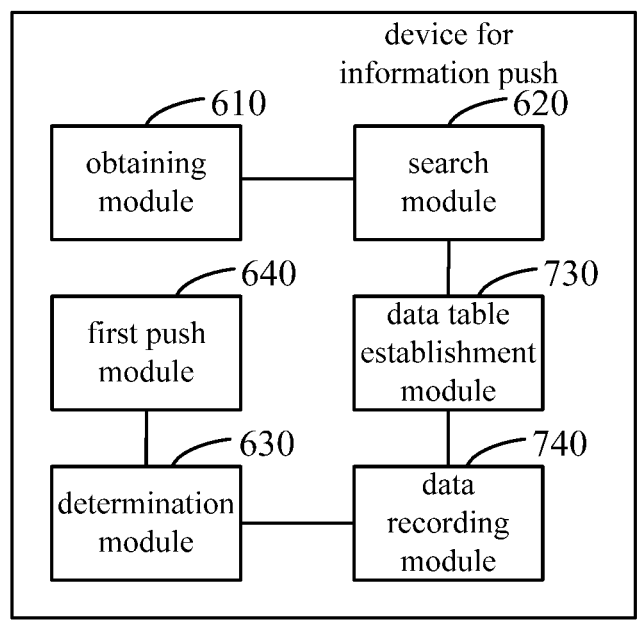
FIG. 12 is a block diagram illustrating another device for information push according to an exemplary embodiment.

FIG. 12 is a block diagram illustrating another device for information push according to an exemplary embodiment, which is based on any of the above-mentioned embodiments illustrated in FIGS. 6-11. The device may further include a data table establishment module 730, and a data recording module 740. The data table establishment module 730 is configured to establish a second data table in advance. The data recording module 740 is configured to record APP package names of the APPs having been successfully installed into the second data table. The determination module 630 is configured to determine whether the APP package name of the APP is included in the second data table, and if so, determine that the APP is installed locally.

Figure 13:
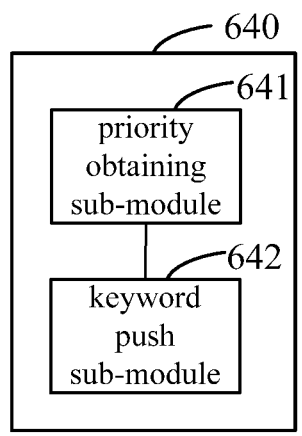
FIG. 13 is a block diagram illustrating another device for information push according to an exemplary embodiment.

FIG. 13 is a block diagram illustrating another device for information push according to an exemplary embodiment, which is based on any of the above-mentioned embodiments illustrated in FIGS. 6-12., The first push module 640 may include a priority obtaining sub-module 641 configured to obtain push priorities of every APP when there are a plurality of APPs, a keyword pushing sub-module 642 configured to push the keyword to a APP having a highest push priority.

Figure 14:
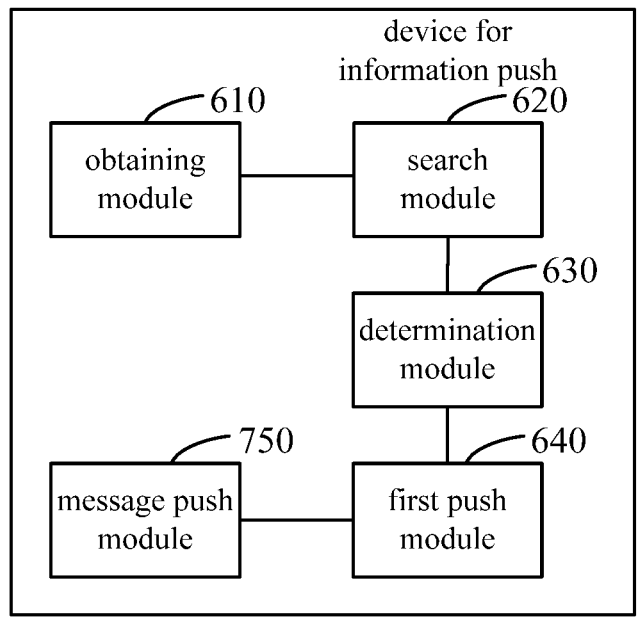
FIG. 14 is a block diagram illustrating another device for information push according to an exemplary embodiment.

FIG. 14 is a block diagram illustrating another device for information push according to an exemplary embodiment, which is based on any of the above-mentioned embodiments illustrated in FIGS. 6-13. The device may further include a message push module 750 configured to push an operation prompt message related with the keyword to the user through the APP when the APP starts.

Figure 15:
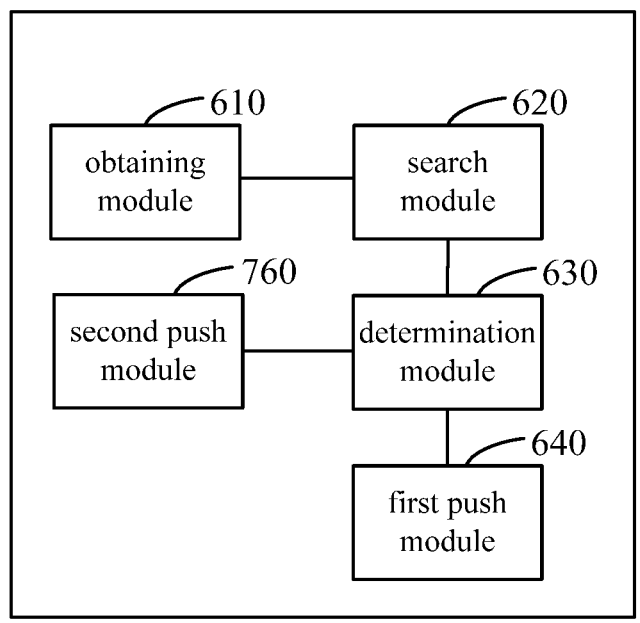
FIG. 15 is a block diagram illustrating another device for information push according to an exemplary embodiment.

FIG. 15 is a block diagram illustrating another device for information push according to an exemplary embodiment, which is based on the above-mentioned embodiments illustrated in FIGS. 6-14. The device may further include: a second push module 760 configured to push an APP name related with the keyword to the user locally if a determination result from the determination module is that the APPs is not installed locally.

Figure 16:
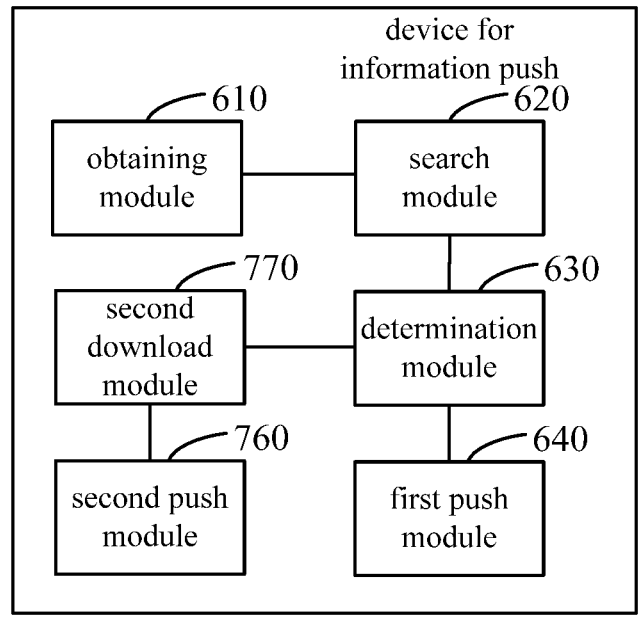
FIG. 16 is a block diagram illustrating another device for information push according to an exemplary embodiment.

FIG. 16 is a block diagram illustrating another device for information push according to an exemplary embodiment, which is based on any of the above-mentioned embodiment illustrated in FIG. 15. The device may further include a second download module 770 configured to download a third data table from a server in advance. The third data table records correspondence relationships between APP package names and keywords, and correspondence relationships between APP categories and APP names.

Figure 17:
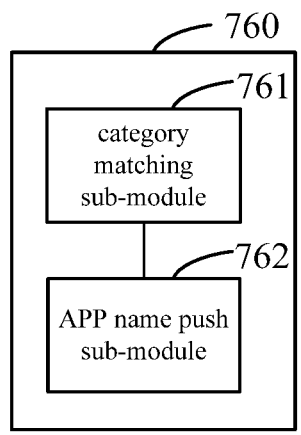
FIG. 17 is a block diagram illustrating another device for information push according to an exemplary embodiment.

FIG. 17 is a block diagram illustrating another device for information push according to an exemplary embodiment, which is based on the above-mentioned embodiment illustrated in FIG. 16. The second push module may include a category matching sub-module 761 configured to search for an APP category matching with the keyword from the third data table, an APP name push sub-module 762 configured to push the APP names under this APP category to the user locally.

The implementations of the functionalities and actions of the respective modules have been described in detail in the implementations of the corresponding steps in the above-mentioned methods, and will not be elaborated herein.

With respect to the embodiments for the device, since it substantially corresponds to the embodiments for the method, the relevant parts may refer to the embodiments for the method. The embodiments for the device described above are merely as an example, wherein the modules described as separate components may or may not be separated physically, the components shown as modules may or may not be physical units, which may locate in one place, or may distribute on a plurality of network units. According to the actual requirements, all or part of the modules may be selected to implement the purpose of the solution of the disclosure. One skilled in the art may understand and implement the disclosure without creative efforts.

Accordingly, a device for information push is also provided in the disclosure, including: a processor and a memory for storing instructions executable by the processor. The processor is configured to obtain a keyword input by a user, identify an Application Program (APP) package name corresponding to the keyword, determining whether an APP corresponding to the APP package name is installed in the device, pushing the keyword to the APP when the App is installed in the device.

Figure 18:
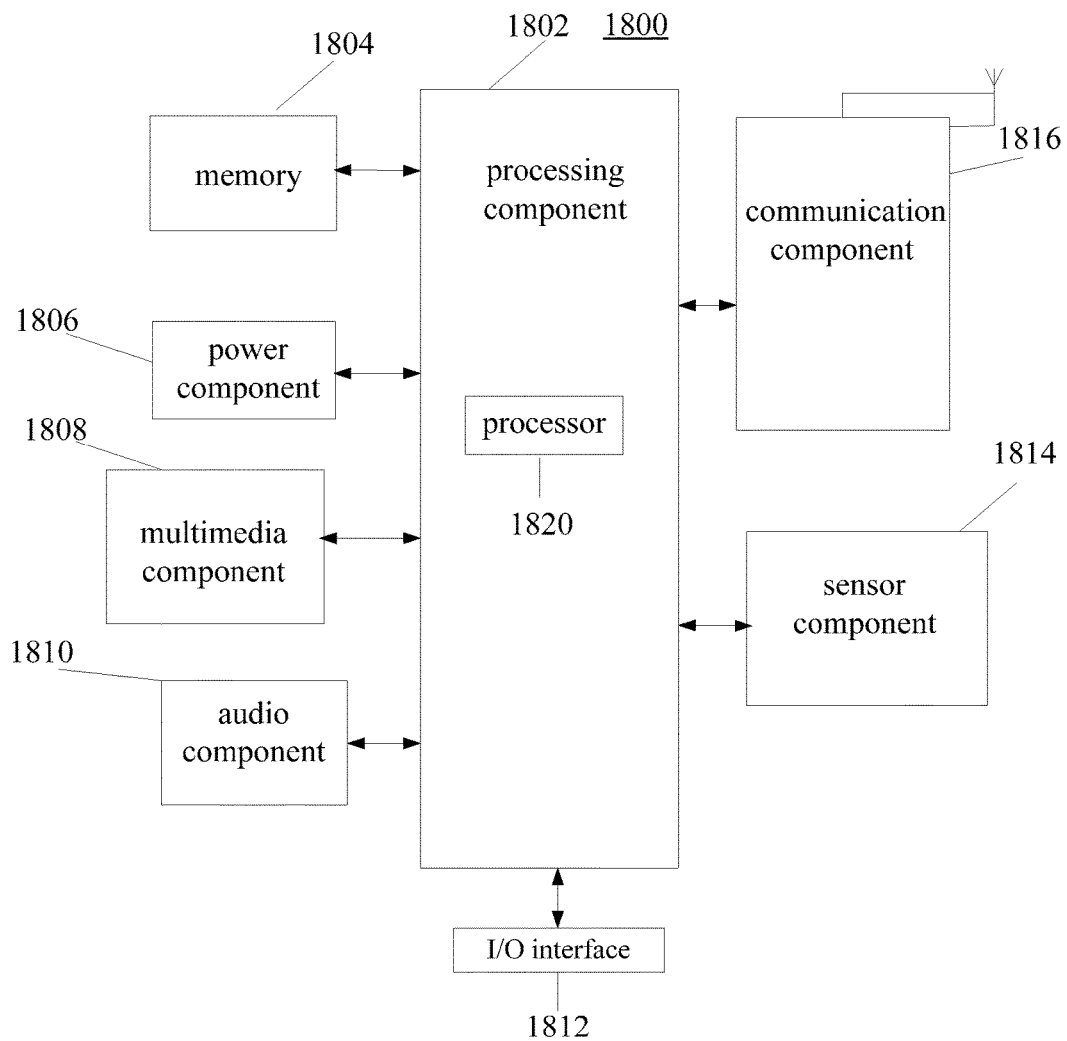
FIG. 18 is a structure schematic diagram illustrating an apparatus for information push according to an exemplary embodiment.

FIG. 18 is a structure schematic diagram illustrating an apparatus 1800 for information push according to an exemplary embodiment. For example, the apparatus 1800 may be a mobile phone, a computer, a digital broadcast terminal, a messaging device, a gaming console, a tablet, a medical device, exercise equipment, a personal digital assistant, an aircraft and the like.

Referring to FIG. 18, the apparatus 1800 may include one or more of the following components: a processing component 1802, a memory 1804, a power component 1806, a multimedia component 1808, an audio component 1810, an input/output (I/O) interface 1812, a sensor component 1814, and a communication component 1816.

The processing component 1802 typically controls overall operations of the apparatus 1800, such as the operations associated with display, telephone calls, data communications, camera operations, and recording operations. The processing component 1802 may include one or more processors 1820 to execute instructions to perform all or part of the steps in the above described methods. Moreover, the processing component 1802 may include one or more modules which facilitate the interaction between the processing component 1802 and other components. For instance, the processing component 1802 may include a multimedia module to facilitate the interaction between the multimedia component 1808 and the processing component 1802.

The memory 1804 is configured to store various types of data to support the operation of the apparatus 1800. Examples of such data include instructions for any applications or methods operated on the apparatus 1800, contact data, phonebook data, messages, pictures, video, etc. The memory 1804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1806 provides power to various components of the apparatus 1800. The power component 1806 may include a power management system, one or more power sources, and any other components associated with the generation, management, and distribution of power for the apparatus 1800.

The multimedia component 1808 includes a screen providing an output interface between the apparatus 1800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1808 includes a front camera and/or a rear camera. The front camera and the rear camera may receive an external multimedia datum while the apparatus 1800 is in an operation mode, such as a photographing mode or a video mode. Each of the front camera and the rear camera may be a fixed optical lens system or have optical focusing and zooming capability.

The audio component 1810 is configured to output and/or input audio signals. For example, the audio component 1810 includes a microphone ("MIC") configured to receive an external audio signal when the apparatus 1800 is in an operation mode, such as a call mode, a recording mode, and a voice recognition mode. The received audio signal may be further stored in the memory 1804 or transmitted via the communication component 1816. In some embodiments, the audio component 1810 further includes a speaker to output audio signals.

The I/O interface 1812 provides an interface between the processing component 1802 and peripheral interface modules, the peripheral interface modules being, for example, a keyboard, a click wheel, buttons, and the like. The buttons may include, but are not limited to, a home button, a volume button, a starting button, and a locking button.

The sensor component 1814 includes one or more sensors to provide status assessments of various aspects of the apparatus 1800. For instance, the sensor component 1814 may detect an open/closed status of the apparatus 1800, relative positioning of components (e.g., the display and the keypad, of the apparatus 1800), a change in position of the apparatus 1800 or a component of the apparatus 1800, a presence or absence of user contact with the apparatus 1800, an orientation or an acceleration/deceleration of the apparatus 1800, and a change in temperature of the apparatus 1800. The sensor component 1814 may include a proximity sensor configured to detect the presence of a nearby object without any physical contact. The sensor component 1814 may also include a light sensor, such as a CMOS or CCD image sensor, for use in imaging applications. In some embodiments, the sensor component 1814 may also include an accelerometer sensor, a gyroscope sensor, a magnetic sensor, a pressure sensor, or a temperature sensor.

The communication component 1816 is configured to facilitate communication, wired or wirelessly, between the apparatus 1800 and other devices. The apparatus 1800 can access a wireless network based on a communication standard, such as WiFi, 2Q or 3Q or a combination thereof. In an exemplary embodiment, the communication component 1816 receives a broadcast signal or broadcast associated information from an external broadcast management system via a broadcast channel. In an exemplary embodiment, the communication component 1816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1804, executable by the processor 1820 in the apparatus 1800, for performing the above-described methods. For example, the non-transitory computer-readable storage medium may be a ROM, a RAM, a CD-ROM, a magnetic tape, a floppy disc, an optical data storage device, and the like.

Each module discussed above, such as the obtaining module 610, the search module 620, the determination module 630, and the first push module 640, may take the form of a packaged functional hardware unit designed for use with other components, a portion of a program code (e.g., software or firmware) executable by the processor or the processing circuitry that usually performs a particular function of related functions, or a self-contained hardware or software component that interfaces with a larger system, for example.

Other embodiments of the invention will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the inventive concept is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for pushing information to an application on a smart device, comprising:
   obtaining an input keyword input by a user;
   parsing a first data table stored in the smart device, the first data table including associations between Application Program (APP) package names and keywords corresponding to user behaviors information reflecting interests and hobbies as well as demands and intensions of the user;
   identifying, from the first data table, a selected APP package name associated with a keyword matching the input keyword;
   determining whether an APP corresponding to the selected APP package name is installed in the smart device;
   pushing the keyword to the APP when the APP is determined to be installed in the smart device;
   presenting an operation prompt message related to the input keyword on the smart device through the APP when the APP starts;
   parsing a third data table including associations between APP categories and supplemental keywords, and associations between the APP categories and supplemental APP package names;
   identifying, from the third data table, a selected APP category associated with a supplemental keyword matching the input keyword; and
   presenting supplemental APP package names associated with the selected APP category on the smart device.

2. The method of claim 1, wherein the obtaining a keyword input by a user comprises:

obtaining a sentence input by the user; and
obtaining the input keyword based on the sentence.

3. The method of claim 2, wherein obtaining the input keyword based on the sentence comprises implementing forward maximum matching segmentation, or reverse maximum matching segmentation on the sentence to obtain the input keyword.

4. The method of claim 1, wherein the first data table is downloaded from a server.

5. The method of claim 1,
wherein the determining whether the APP is installed in the smart device comprises determining whether an APP package name of the APP is included in a second data table, wherein the second data table including App package names of APPs installed in the smart device.

6. The method of claim 1, wherein the pushing the keyword to the APP comprises:
determining a plurality of APPs related to the keyword;
determining push priorities of the plurality of APPs; and
pushing the keyword to an APP having a highest push priority.

7. The method of claim 6, wherein the push priorities are determined based on at least one of a number of downloads for each APP and a review score for each APP by users.

8. The method of claim 1, further comprising:
when the APP is determined not to be installed in the smart device, pushing an APP name related to the keyword on a display of the smart device.

9. A non-transitory computer-readable storage medium having stored therein instructions for pushing information to an application on a smart device that, when executed by a processor of the smart device, cause the smart device to:
obtain an input keyword input by a user;
parse a first data table stored in the smart device, the first data table including associations between Application Program (APP) package names and keywords corresponding to user behaviors information reflecting interests and hobbies as well as demands and intensions of the user;
identify, from the first data table, a selected APP package name associated with a keyword matching the input keyword;
determine whether an APP corresponding to the selected APP package name is installed in the smart device;
push the keyword to the APP when the APP is determined to be installed in the smart device;
present an operation prompt message related to the keyword on the smart device through the APP when the APP starts;
parse a third data table including associations between APP categories and supplemental keywords, and associations between the APP categories and supplemental APP package names;
identify, from the third data table, a selected APP category associated with a supplemental keyword matching the input keyword; and
present supplemental APP package names associated with the selected APP category on the smart device.

10. A device for pushing information to an application, comprising:
a processor;
a memory for storing instructions executable by the processor,
wherein the processor is configured to:
obtain an input keyword input by a user;
parse a first data table stored in the smart device, the first data table including associations between Application Program (APP) package names and keywords corresponding to user behaviors information reflecting interests and hobbies as well as demands and intensions of the user;
identify, from the first data table, a selected APP package name associated with a keyword matching the input keyword;
determine whether an APP corresponding to the selected APP package name is installed in the smart device;
push the keyword to the APP when the APP is determined to be installed in the smart device;
present an operation prompt message related to the keyword on the smart device through the APP when the APP starts;
parse a third data table including associations between APP categories and supplemental keywords, and associations between the APP categories and supplemental APP package names;
identify, from the third data table, a selected APP category associated with a supplemental keyword matching the input keyword; and
present supplemental APP package names associated with the selected APP category on the smart device.

11. A device of claim 10, wherein the processor is further configured to:
obtain a sentence input by the user; and
obtain the input keyword based on the sentence.

12. The device of claim 10, wherein the first data table is downloaded from a server.

13. The device of claim 12, wherein obtaining the input keyword based on the sentence comprises implementing forward maximum matching segmentation, or reverse maximum matching segmentation on the sentence to obtain the input keyword.

14. The device of claim 13, wherein the processor is further configured to:
push an APP name related to the keyword on a display of the smart device when the APP is determined not to be installed locally.

15. The device of claim 10, wherein the processor is further configured to:
determine whether an APP package name of the APP is included in a second data table including APP package names of APPs installed in the device.

16. The device of claim 10, wherein the processor is further configured to:
determine a plurality of APPs related to the keyword;
determine push priorities of the plurality of APPs; and
push the keyword to an APP having a highest push priority.

17. The device of claim 16, wherein the push priorities are determined based on at least one of a number of downloads for each APP and a review score for each APP by users.

* * * * *